No. 725,454. PATENTED APR. 14, 1903.
S. KROHN.
ALTERNATING CURRENT MOTOR SYSTEM.
APPLICATION FILED SEPT. 20, 1901.
NO MODEL.

Witnesses.
John Ellis Glenn.

Inventor.
Sigvald Krohn
by
Atty.

UNITED STATES PATENT OFFICE.

SIGVALD KROHN, OF BERLIN, GERMANY, ASSIGNOR TO GENERAL ELECTRIC COMPANY, A CORPORATION OF NEW YORK.

ALTERNATING-CURRENT MOTOR SYSTEM.

SPECIFICATION forming part of Letters Patent No. 725,454, dated April 14, 1903.

Application filed September 20, 1901. Serial No. 75,792. (No model.)

*To all whom it may concern:*

Be it known that I, SIGVALD KROHN, a subject of the King of Sweden and Norway, residing at Berlin, Germany, have invented certain new and useful Improvements in Alternating-Current Motor Systems, (Case No. 2,407,) of which the following is a specification.

When electric railroads are arranged to be supplied with alternating current of high potential, it is desirable for purposes of safety that current should be supplied at comparatively low potential in the neighborhood of stations and other accessible places. These conditions present some difficulties owing to the fact that the motors which are designed to run normally with high-potential current must when in the neighborhood of such stations or other accessible places draw their supply of current from low-potential conductors through step-up transforming devices, which lower the efficiency of operation and necessarily take up valuable space. To avoid the necessity for such transforming devices, I make use of motors of special construction, the relatively movable members of each of the motors being provided with two windings, respectively, one a high-potential winding and the other a low-potential winding. When the railway-vehicle receives current from the low-potential mains, the low-potential winding of the motor or motors is connected, through suitable collecting devices, to the low-potential supply-conductors, the high-potential winding of the motor or motors being closed upon a variable resistance, which may be cut in or out to any extent desired or short-circuited in a well-understood manner. On the other hand, when the vehicle receives current from the high-potential mains or supply-conductors the high-potential winding of the motor or motors is connected, through suitable means, to these conductors, the low-potential winding or windings being then closed upon a variable resistance, which, as in the first instance, may be varied or short-circuited as desired. Suitable switching devices perform the operations indicated.

For a better understanding of the invention reference is to be had to the following description, taken in connection with the accompanying drawings.

The scope of the invention is to be determined by reference to the claims appended hereto, in which I have set forth with particularity the points of novelty which I believe my invention to possess.

Figure 1:
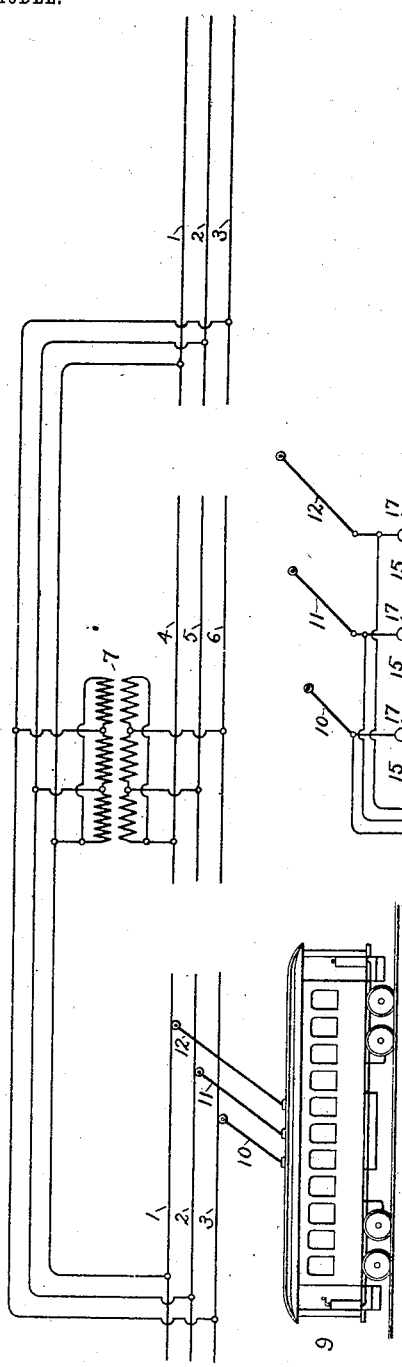
Figure 2:
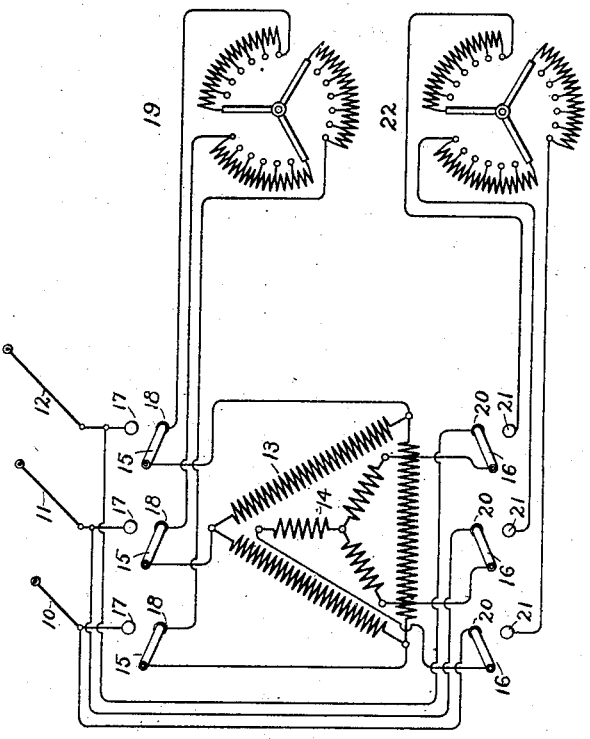

In the drawings, Figure 1 represents diagrammatically an alternating-current railroad system, and Fig. 2 an arrangement of motor connections for use in connection with such a system.

In Fig. 1 the conductors 1 2 3 represent three-phase alternating-current supply-wires of high potential, such as may be supposed to exist in portions of the system lying between stations. The supply-wires 4 5 6 represent those in the neighborhood of a station or some other exposed place, and for that reason are of comparatively low potential. These conductors may of course be supplied from a source separate from the source of supply of the conductors 1 2 3, but in the present instance are shown as supplied from the same source through the intervention of a set of three-phase step-down transformers 7. A railway-vehicle is indicated conventionally at 9 and is provided with some sort of collecting devices—such as trolleys 10, 11, and 12—for making connection with the working or supply conductors referred to above.

Fig. 2 represents in diagram a motor and circuit connections therefor suitable for use with the supply system above described. Although but one motor is indicated, it will of course be understood that the invention is not limited to the use of one motor alone, but may include the coöperative employment of a plurality of motors.

In Fig. 2 the winding 13 represents a high-potential winding for one member of an induction-motor, the other member of the motor being provided with a low-potential winding, (indicated at 14.) The ratio of the numbers of turns of the windings may of course vary considerably, so long as it is not unity. The terminals of the high-potential winding are connected to a set of switches 15, while in a similar manner the terminals of the low-potential winding 14 are connected to another set of switches 16. The switches 15 are provided with two sets of fixed contacts, one set 17 having its members connected, respectively, to the supply-conductors through the trolleys 10, 11, and 12 and the other set of fixed contacts 18 connected to the terminals of a variable-resistance device 19. In a similar manner the switches 16 are provided with two sets of fixed contacts, one set 20 having its members connected, respectively, to the trolleys 10, 11, and 12 and the other set 21 having its members connected, respectively, to a variable resistance 22.

In the arrangement shown in Fig. 2 the switches are represented in a position such that current is supplied from the trolleys to the low-potential winding 14 of the motor, the high-potential winding 13 being under these circumstances connected, as shown, to the variable resistance 19. When the trolleys 10, 11, and 12 run onto supply-conductors of high potential, as represented in Fig. 1, the switches 16 are thrown into their opposite position, so as to disconnect from the trolleys and connect the resistance 22 across the terminals of the low-potential winding, the switches 15 being at the same time reversed in position, so as to disconnect the resistance 19 and connect the terminals of the high-potential winding 13 directly to the trolleys 10, 11, and 12. The operation of the switches may be performed by hand or automatically by magnetic means, if desired.

Although I have described my invention as applied to an electric-railway system, it will be obvious to one skilled in the art that many features thereof are not limited to use in this relation, but may be applied to other purposes as well.

Having thus described my invention, what I claim as new, and desire to secure by Letters Patent of the United States, is—

1. An induction-motor having windings of respectively different numbers of turns, means for connecting either of said windings to supply-conductors, and means for closing the circuit of one winding upon a variable resistance when the other is connected to supply-conductors.

2. The combination of an induction-motor having two windings of respectively different numbers of turns, a resistance for each winding, and means for utilizing either winding as an inducing member and the other winding as the induced member in connection with the resistance corresponding thereto.

3. The combination of an induction-motor having relatively high and low potential windings, means for utilizing the high-potential winding as the inducing member when the motor is run by high-potential current, and means for utilizing the low-potential winding as the inducing member when the motor is run by low-potential current.

4. The combination of supply-conductors, an induction-motor having relatively high potential and low potential windings, and means for connecting either of the windings to said supply-conductors at will.

5. The combination of sets of supply-conductors, an induction-motor having a high-potential winding and a low-potential winding, and means for connecting either winding to the corresponding set of conductors and the other winding upon a variable resistance.

6. The combination of high-potential supply-conductors, low-potential supply-conductors, an alternating-current induction-motor having high-potential and low-potential windings respectively, means for connecting either of said windings to the corresponding supply-conductors, and means for simultaneously closing the circuit of the other winding.

In witness whereof I have hereunto set my hand this 18th day of September, 1901.

SIGVALD KROHN.

Witnesses:
BENJAMIN B. HULL,
EDWARD WILLIAMS, Sr.